(12) United States Patent
Yamaguchi et al.

(10) Patent No.: US 8,392,643 B2
(45) Date of Patent: Mar. 5, 2013

(54) DATA PROCESSING DEVICE, SEMICONDUCTOR INTEGRATED CIRCUIT DEVICE, AND ABNORMALITY DETECTION METHOD

(75) Inventors: Ryoichi Yamaguchi, Kanagawa (JP); Hisashi Abe, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 211 days.

(21) Appl. No.: 13/034,236

(22) Filed: Feb. 24, 2011

(65) Prior Publication Data

US 2011/0219157 A1 Sep. 8, 2011

(30) Foreign Application Priority Data

Mar. 5, 2010 (JP) ................................ 2010-049449

(51) Int. Cl.
*G06F 13/24* (2006.01)
(52) U.S. Cl. ........................................ 710/267; 710/260
(58) Field of Classification Search .................. 710/267
See application file for complete search history.

(56) References Cited

U.S. PATENT DOCUMENTS

| | | | | |
|---|---|---|---|---|
| 5,047,919 A * | 9/1991 | Sterling et al. | ............... | 714/47.3 |
| 5,410,715 A * | 4/1995 | Ishimoto et al. | ............... | 710/264 |
| 5,701,494 A * | 12/1997 | Satoh | ............... | 710/262 |
| 5,805,883 A * | 9/1998 | Saitoh | ............... | 718/105 |
| 5,923,887 A * | 7/1999 | Dutton | ............... | 710/260 |
| 6,065,089 A * | 5/2000 | Hickerson et al. | ............... | 710/266 |
| 6,189,066 B1 * | 2/2001 | Lowe et al. | ............... | 710/260 |
| 7,054,972 B2 * | 5/2006 | Parry et al. | ............... | 710/260 |
| 7,080,178 B2 * | 7/2006 | Kimelman et al. | ............... | 710/264 |
| 7,296,271 B1 * | 11/2007 | Chalmer et al. | ............... | 718/108 |
| 7,617,389 B2 * | 11/2009 | Nikami et al. | ............... | 712/244 |
| 7,788,434 B2 * | 8/2010 | Pesavento et al. | ............... | 710/262 |
| 8,058,751 B2 * | 11/2011 | Parker | ............... | 307/127 |
| 8,131,901 B2 * | 3/2012 | Mansell et al. | ............... | 710/260 |
| 2001/0032287 A1 * | 10/2001 | Lai et al. | ............... | 710/260 |
| 2004/0111549 A1 * | 6/2004 | Connor et al. | ............... | 710/260 |
| 2004/0117534 A1 * | 6/2004 | Parry et al. | ............... | 710/260 |
| 2005/0177668 A1 * | 8/2005 | Kimelman et al. | ............... | 710/264 |
| 2007/0204085 A1 * | 8/2007 | Orlando et al. | ............... | 710/261 |
| 2010/0023666 A1 * | 1/2010 | Mansell et al. | ............... | 710/267 |
| 2011/0185217 A1 * | 7/2011 | Eyermann et al. | ............... | 713/502 |

FOREIGN PATENT DOCUMENTS

JP 2000-20352 A 1/2000

* cited by examiner

*Primary Examiner* — Ryan Stiglic
(74) *Attorney, Agent, or Firm* — Sughrue Mion, PLLC (57) ABSTRACT

A data processing device for detecting the abnormal operation of a CPU is provided. The data processing device comprises a CPU, an interrupt counter, and a counter-abnormal-value detection circuit. The interrupt counter increments a count value based on an interrupt start signal which is outputted in response to an interrupt signal indicative of an interrupt request to the CPU and which indicates that the interrupt request has been accepted, and decrements the count value based on an end-of-interrupt signal which indicates that processing corresponding to the interrupt has completed. The counter-abnormal-value detection circuit detects abnormalities by comparing the count value with a predetermined value.

14 Claims, 6 Drawing Sheets

DATA PROCESSING DEVICE, SEMICONDUCTOR INTEGRATED CIRCUIT DEVICE, AND ABNORMALITY DETECTION METHOD

CROSS-REFERENCE TO RELATED APPLICATIONS

The disclosure of Japanese Patent Application No. 2010-49449 filed on Mar. 5, 2010 including the specification, drawings and abstract is incorporated herein by reference in its entirety.

BACKGROUND

1. Field of the Invention

The present invention relates to a data processing device and a semiconductor integrated circuit device, especially to an abnormality detection method for detecting operation abnormalities of the data processing device and the semiconductor integrated circuit.

2. Description of Related Art

In recent years, following a rise of global concerns to an environmental problem, regulations of power consumption or a standby power requirement have come to be required. Various electronic devices used in everyday life, such as home-oriented disaster prevention and security equipments and portable devices, etc., have prevailed increasingly. In the field of such electronic devices, development competition in enhancement of extended life and miniaturization of a battery to be used has become intense. Accordingly, energy saving in a system level is becoming an important subject.

In a micro controller for controlling a standby state of a system, and a micro controller to be used for a battery-driven small system, an intermittent operation which repeats alternately a standby mode in which only a part of peripheral functions operate, and a normal operation mode in which both of the peripheral functions and a CPU operate, is worth considering from a viewpoint of low power consumption. In application aiming at a periodical loading of a signal outputted from an external device or a sensor, lowering power consumption is generally performed by starting the normal operation mode in an event-driven manner.

On the other hand, in a digital circuit of a semiconductor integrated circuit, there is an asynchronous design technique which reduces consumption current in a clock synchronous operation, by employing a handshake signal of a preceding and a following circuit of a flip-flop as a clock input, instead of the ordinal clock signal to be inputted into the flip-flop. Also in a micro controller which is operated in an event-driven manner, it is possible to use the asynchronous design technique which does not employ a clock, in order to reduce power consumption.

In an ordinary micro controller, an abnormality detection of CPU operation is performed by employing a timer counter called a watchdog timer in many cases. In the method utilizing a watchdog timer, a counter counts a clock, and a CPU clears the counter for every fixed time by instruction so that the counter may not overflow. If the CPU operates normally, the counter will not overflow. When an overflow is detected, it is determined that abnormalities due to an overrun, etc. of the CPU have occurred. That is, since the abnormality detection method by means of a watchdog timer requires a clock for an abnormality detection, it is difficult to desynchronize the abnormality detection method. Accordingly, what is expected is realization of an abnormality detection circuit which can be implemented also in an asynchronous circuit.

In cases where a CPU is realized by the asynchronous design technique, when a noise intermingles unintentionally to a signal serving as an operation trigger, due to a power supply noise etc. in a standby state, there is a possibility that a handshake circuit may malfunction, updating a value of a program counter or various flag registers to a false value. It is thought that such a possibility is higher than malfunction at the time of a clock stoppage in a CPU of a synchronous system. Accordingly, a measure for realizing a safer system is desired to be taken.

Japanese Patent Application Publication No. 2000-20352 discloses technology for detecting abnormalities by monitoring a stack pointer employed when a micro controller performs an interrupt process. The stack pointer specifies a storage destination address of a stack which stores an address information, etc. of a return point. Abnormalities are detected when data is excessively saved to the stack, or when data is excessively recovered from the stack.

SUMMARY

Such technology can be applied as an abnormality detection circuit for a micro controller to which an asynchronous design technique is applied and which operates in an event-driven manner. However, it is difficult to detect abnormalities due to a CPU overrun which does not influence a stack pointer, and abnormalities by which a micro controller falls into a deadlock state. That is, saving to a stack (or push) and recovering from a stack (or pop) are not performed in a case where a micro controller has fallen into an endless loop in a program routine which does not operate a stack pointer, or in a case where a CPU does not operate due to a deadlock state. Accordingly, neither stack overflow nor stack underflow occurs, and abnormalities cannot be detected.

The present invention provides a data processing device, a semiconductor integrated circuit device, and an abnormality detection method, which can detect abnormal operation of a CPU.

In the following, means for solving a problem is explained using numbers and signs which are used in the description of embodiments. These numbers and signs are appended in order to clarify correspondence relation between the description of what is claimed is and the description of embodiments. However, these numbers and signs shall not be used for an interpretation of a technical scope of the invention given by what is claimed is.

According to an aspect of the present invention, a semiconductor integrated circuit device comprises a CPU (100); an interrupt counter (410); and a counter-abnormal-value detection circuit (430). The interrupt counter (410) increments a count value based on an interrupt start signal (IRS) which is outputted in response to an interrupt signal (INT) indicative of an interrupt request to the CPU (100) and which indicates that the interrupt request has been accepted, and decrements the count value based on an end-of-interrupt signal (IRE) which indicates that processing corresponding to the interrupt has completed. The counter-abnormal-value detection circuit (430) detects abnormalities by comparing the count value (IRC) with a predetermined value.

According to another aspect of the present invention, an abnormality detection method is for detecting an operation abnormality of a CPU and comprises: incrementing a count value based on an interrupt start signal (IRS) which is outputted in response to an interrupt signal (INT) indicative of an interrupt request to a CPU (100) and which indicates that the interrupt request has been accepted; decrementing the count value based on an end-of-interrupt signal (IRE) which indicates that processing corresponding to the interrupt has completed; and detecting abnormalities of the counter value by comparing the count value (IRC) with a predetermined value.

According to the present invention, it is possible to provide a data processing device, a semiconductor integrated circuit device, and an abnormality detection method, which can detect even an abnormal state in which a CPU does not operate a stack.

DETAILED DESCRIPTION OF THE PREFERRED EMBODIMENTS

Hereinafter, with reference to the accompanying drawings, the embodiments of the present invention are explained in detail.

Figure 1:
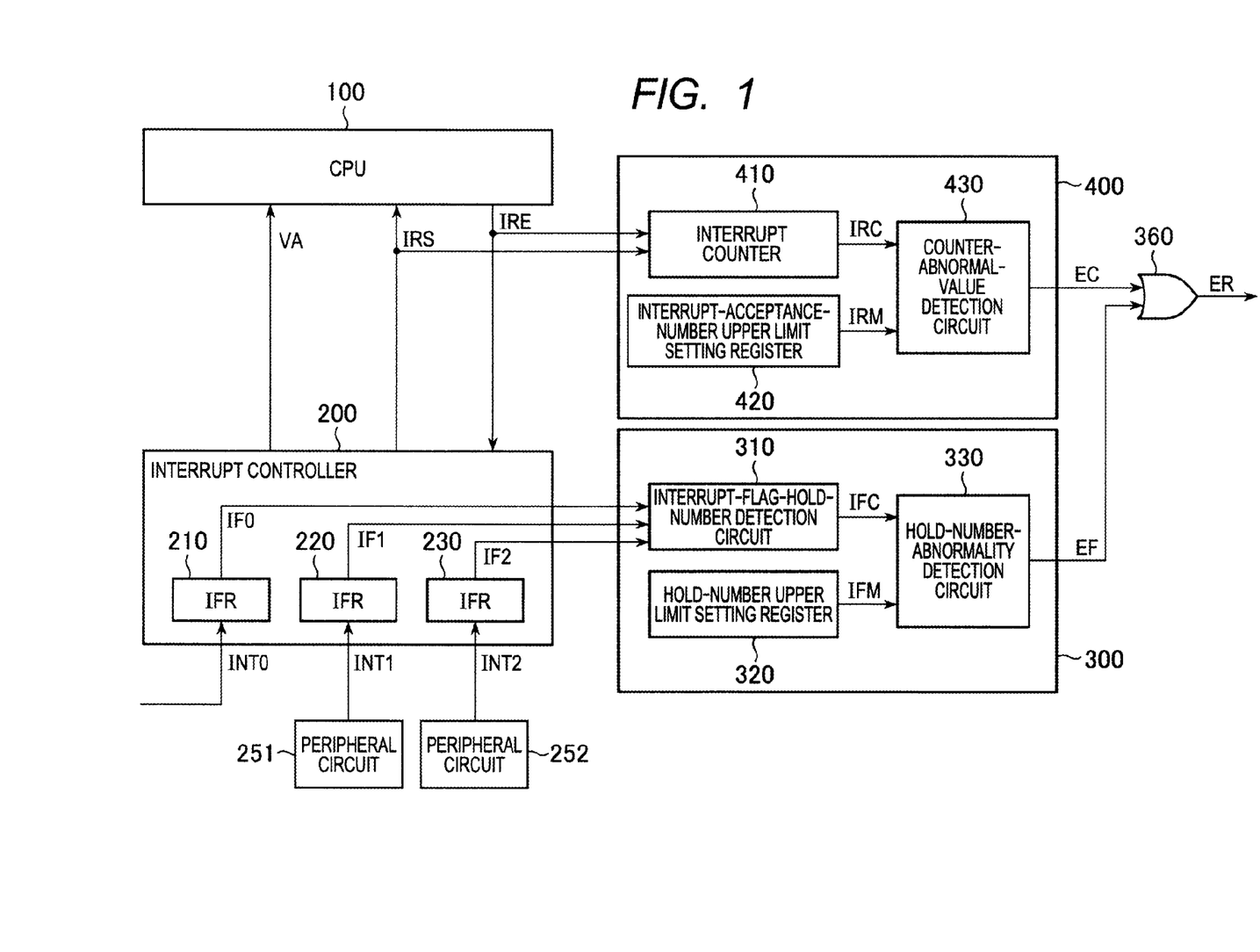
FIG. 1 is a drawing illustrating configuration of a data processing device according to a first embodiment of the present invention.

FIG. 1 is a drawing illustrating configuration of a data processing device according to a first embodiment. The data processing device is a semiconductor integrated circuit device comprising a CPU 100, an interruption controller 200, abnormality detection circuits 300 and 400, a logical addition circuit 360, and peripheral circuits 251 and 252. The interruption controller 200 inputs an internal interrupt signal INT1 outputted by the peripheral circuit 251, an internal interrupt signal INT2 outputted by the peripheral circuit 252, and an external interrupt signal INT0 inputted from the exterior of the data processing device. The interruption controller 200 comprises interrupt flag registers 210, 220, and 230. The interrupt flag registers 210, 220, and 230 input the external interrupt signal INT0, the internal interrupt signal INT1, and the internal interrupt signal INT2, respectively. When the interrupt flag registers 210, 220, and 230 are set, the interruption controller 200 sets a vector address VA corresponding to the interrupt flag registers 210, 220, and 230, and outputs an interrupt start signal IRS to the CPU 100 to notify of occurrence of an interrupt. Signals IF0, IF1, and IF2 which indicate respectively outputs of the interrupt flag registers 210, 220, and 230 are outputted to the abnormality detection circuit 300.

The CPU 100 performs an interrupt process by inputting the interrupt start signal IRS and the vector address VA which are outputted by the interruption controller 200. After completing the interrupt process, the CPU 100 outputs an end-of-interrupt signal IRE to the interruption controller 200 and the abnormality detection circuit 400.

The abnormality detection circuit 400 comprises an interrupt counter 410, an interrupt-acceptance-number upper limit setting register 420, and a counter-abnormal-value detection circuit 430. The interrupt counter 410 increments an interrupt count value IRC upon inputting the interrupt start signal IRS, and decrements the interrupt count value IRC upon inputting the end-of-interrupt signal IRE. The interrupt counter 410 outputs the interrupt count value IRC to the counter-abnormal-value detection circuit 430. The interrupt-acceptance-number upper limit setting register 420 holds an acceptable number of interrupt, and outputs it to the counter-abnormal-value detection circuit 430. It is preferable that the acceptable number of interrupt can be set up by the CPU 100. The counter-abnormal-value detection circuit 430 inputs the interrupt count value IRC and an output IRM of the interrupt-acceptance-number upper limit setting register 420. When the interrupt count value becomes equal to or greater than the acceptable number of interrupt, the counter-abnormal-value detection circuit 430 outputs a counter abnormality detection signal EC.

The abnormality detection circuit 300 comprises an interrupt-flag-hold-number detection circuit 310, a hold-number upper limit setting register 320, and a hold-number-abnormality detection circuit 330. The interrupt-flag-hold-number detection circuit 310 inputs the outputs IF0, IF1, and IF2 of the interrupt flag registers 210, 220, and 230, and outputs an interrupt flag hold number IFC. The hold-number upper limit setting register 320 holds the number of interrupt capable of being held, and outputs it to the hold-number-abnormality detection circuit 330. It is preferable that the number of interrupt capable of being held can be set up by the CPU 100. The hold-number-abnormality detection circuit 330 inputs the interrupt flag hold number IFC and the output IFM of the hold-number upper limit setting register 320. When the interrupt hold number becomes equal to or greater than the number of interrupt capable of being held, the hold-number-abnormality detection circuit 330 outputs a hold-number-abnormality detection signal EF.

The logical addition circuit 360 inputs the counter abnormality detection signal EC and the hold-number-abnormality detection signal EF, and outputs an abnormality detection signal ER.

The interrupt flag registers 210, 220, and 230 of the interruption controller 200 are set by respective rising of the external interrupt signal INT0, the internal interrupt signal INT1, and the internal interrupt signal INT2, and are cleared by rising of the interrupt start signal IRS. The interruption controller 200 outputs the interrupt start signal IRS and the vector address VA to the CPU 100, when the interrupt flag registers 210, 220, and 230 are set. For example, when the interrupt flag register 220 is set from a state where the interrupt flag registers 210, 220, and 230 are cleared altogether, the interrupt start signal IRS becomes active, and an interrupt processing address corresponding to the interrupt flag register 220 is set to the vector address VA. The interruption controller 200 manages interrupt priority. Therefore, output timing of the interrupt start signal IRS and the vector address VA change according to the interrupt priority. It is assumed that priority is set, from highest to lowest, in the order of the interrupt flag registers 210, 220, and 230. When the interrupt flag register 220 is in a set state, even if the interrupt flag register 230 is set, the interrupt start signal IRS and the vector address do not change. However, when the interrupt flag register 210 is set, the interrupt start signal IRS is generated and an interrupt processing address corresponding to the interrupt flag register 210 is set to the vector address VA.

When the interrupt start signal IRS becomes active, the CPU 100 starts an interrupt process indicated by the vector address VA. When the interrupt process is completed, the CPU 100 activates the end-of-interrupt signal IRE.

When the end-of-interrupt signal IRE becomes active, the interrupt controller 200 detects that the interrupt process which the CPU 100 has performed is completed. If there is an interrupt under hold, the interrupt controller 200 controls outputting of the interrupt start signal IRS and the vector address VA, according to the priority.

The interrupt counter 410 of the abnormality detection circuit 400 increments the count value by the interrupt start signal IRS and decrements the count value by the end-of-interrupt signal IRE. Therefore, the count value of the interrupt counter 410 expresses the number of multiple interrupts at the time of normal operation. The value is outputted as the interrupt count value IRC. The interrupt-acceptance-number upper limit setting register 420 is a register which is set up when the CPU 100 executes a program, and the setting value thereof indicates an upper limit number of the multiple interrupts. Here, it is assumed that "3" is set to the interrupt-acceptance-number upper limit setting register 420. The counter-abnormal-value detection circuit 430 detects whether there are any abnormalities in the interrupt count value IRC. Specifically, when the interrupt count value IRC has underflowed and when the interrupt count value IRC has reached the value IRM set to the interrupt-acceptance-number upper limit setting register 420, the counter abnormality detection signal EC is outputted.

The interrupt-flag-hold-number detection circuit 310 of the abnormality detection circuit 300 outputs, as the interrupt flag hold number IFC, the number of registers which are set, out of the interrupt flag registers 210, 220, and 230. This indicates the number of hold of interrupts of which processing is not started by the CPU 100. The hold-number upper limit setting register 320 is a register set up when the CPU 100 executes a program, and the setting value thereof indicates upper limit of the number of hold of interrupts of which processing is not started. Here, it is assumed that "3" is set to the hold-number upper limit setting register 320. The hold-number-abnormality detection circuit 330 compares the interrupt flag hold number IFC with the output IFM of the hold-number upper limit setting register 320. When the interrupt flag hold number IFC is equal to or exceeds the output IFM, the hold-number-abnormality detection circuit 330 outputs the hold-number-abnormality detection signal EF.

The counter abnormality detection signal EC and the hold-number-abnormality detection signal EF are fed to the logical addition circuit 360. When at least one of the counter abnormality detection signal EC and the hold-number-abnormality detection signal EF is active, the logical addition circuit 360 determines that abnormalities occur and activates the abnormality detection signal ER.

Next, operation up to the abnormality detection is explained.

Figure 2:
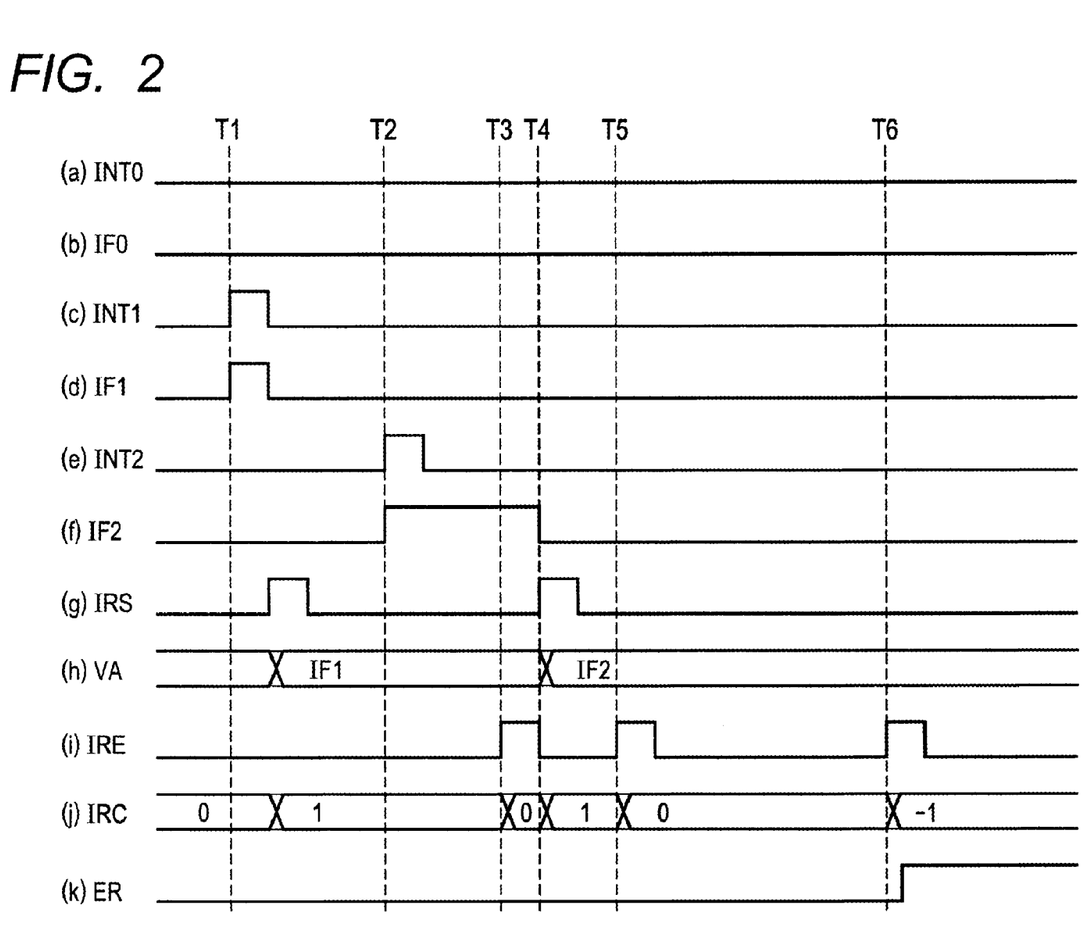
FIG. 2 is a timing chart explaining operation of the data processing device according to the first embodiment.

FIG. 2 illustrates an example of a timing chart for the case where the interrupt counter 410 underflows. The present example illustrates the case where the number of start and the number of end in multiple interrupts are counted in the abnormality detection circuit 400, and the number of counts has underflowed, resulting in outputting of the abnormality detection signal ER. The present example illustrates operation for detecting abnormalities when an interrupt process is unintentionally performed due to abnormalities of the CPU 100.

At time T1, the internal interrupt signal INT1 becomes active (FIG. 2 (c)), and the interrupt flag register 220 is set (FIG. 2 (d)). When the interrupt flag register 220 is set, the interrupt start signal IRS and the vector address VA which indicates an interrupt process corresponding to the interrupt flag register 220 become active (FIG. 2 (g), (h)). The interrupt counter 410 is incremented and the output IRC indicates "1" (FIG. 2 (j)). The interrupt start signal IRS becomes active, and at the same time, the interrupt flag register 220 is cleared (FIG. 2 (d)).

At time T2, the internal interrupt signal INT2 becomes active (FIG. 2 (e)), and the interrupt flag register 230 is set (FIG. 2 (f)). However, the end-of-interrupt signal IRE is not active after time T1 (FIG. 2(i)). That is, since the interrupt process by the interrupt flag register 220 is under way, even if the interrupt flag register 230 with priority lower than that of the interrupt flag register 220 is set, the interrupt start signal IRS does not become active (FIG. 2 (g)), and the vector address VA does not change (FIG. 2 (h)).

At time T3, by using the end-of-interrupt signal IRE, the CPU 100 notifies the interrupt controller 200 and the abnormality detection circuit 400 that the interrupt process to the internal interrupt signal INT1 has ended (FIG. 2(i)). By the notice, the interrupt counter 410 is decremented, and the output IRC is set to "0" (FIG. 2 (j)). Since the interrupt process to the internal interrupt signal INT1 has ended, the interrupt controller 200 activates the interrupt start signal IRS at time T4 (FIG. 2 (g)), and the vector address VA which indicates an interrupt process corresponding to the interrupt flag register 230 is set (FIG. 2 (h)). Further, the interrupt counter 410 is incremented (FIG. 2 (j)), and the interrupt flag register 230 is cleared, accordingly, the output IF2 becomes inactive (FIG. 2 (f)).

At time T5, the CPU 100 activates the end-of-interrupt signal IRE, and notifies the interrupt controller 200 and the abnormality detection circuit 400 that the interrupt process to the interrupt signal INT2 has ended (FIG. 2 (i)). The interrupt counter 410 decrements the count value, and the output IRC indicates "0" (FIG. 2 (j)). At this time, all interrupts are completed.

Here, it is assumed that an interrupt process which is not intended occurs in the CPU 100 after time T5. At time T6, when the end-of-interrupt signal IRE becomes active in spite of the fact that the interrupt start signal IRS is not inputted (FIG. 2(i)), the interrupt counter 410 is decremented and underflows (FIG. 2 (j)). The counter-abnormal-value detection circuit 430 detects abnormalities, and outputs the counter abnormality detection signal EC; accordingly, the abnormality detection signal ER is rendered active (FIG. 2 (k)).

Figure 3:
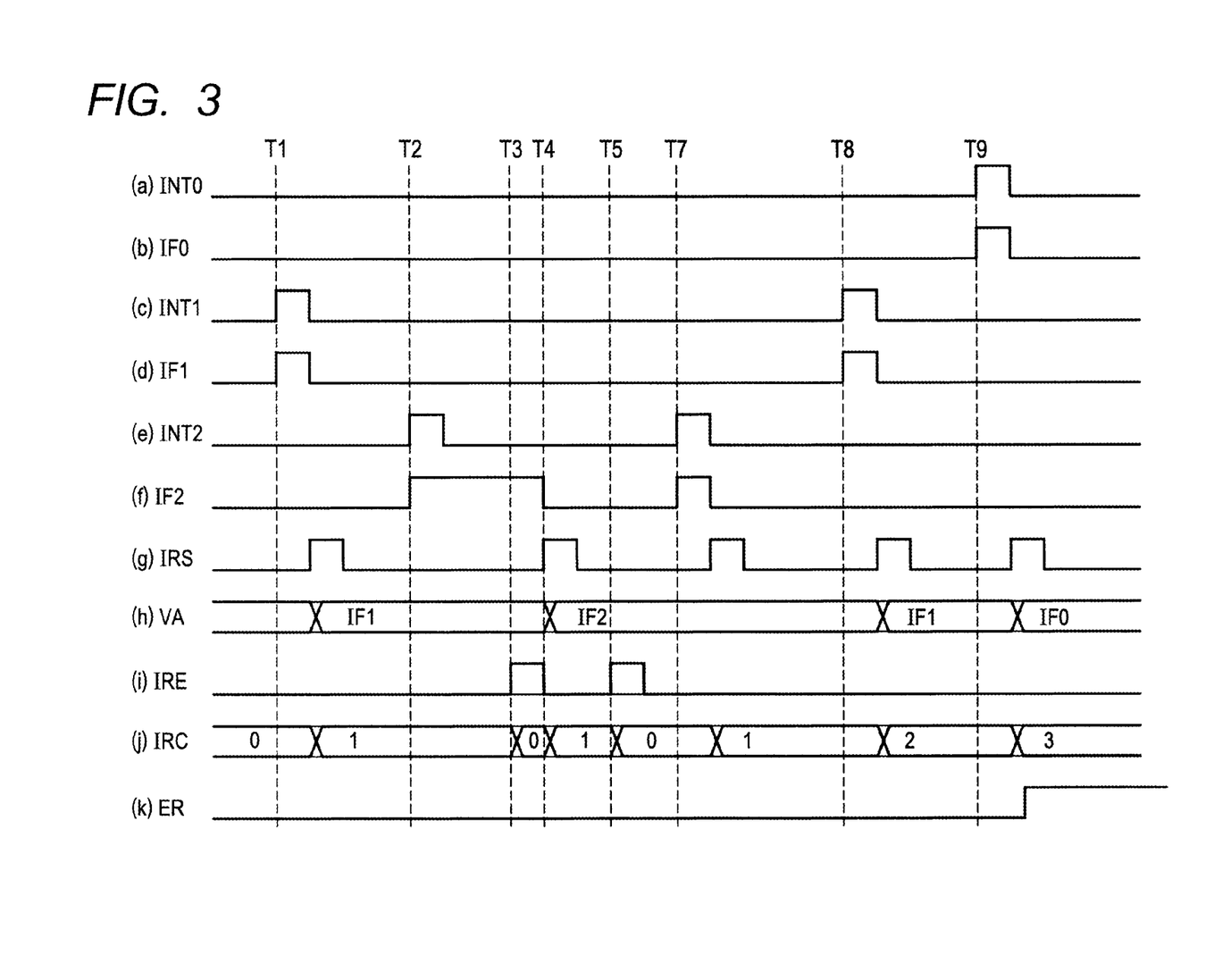
FIG. 3 is a timing chart explaining another operation of the data processing device according to the first embodiment.

FIG. 3 illustrates an example of a timing chart for the case where abnormalities that the interrupt counter 410 exceeds a predetermined number are detected. In the abnormality detection circuit 400, the number of start and the number of end in multiple interrupts are counted, and when the number of counts exceeds a fixed value, the abnormality detection signal ER is outputted. The present example illustrates operation for detecting abnormalities, when the interrupt start signal IRS is generated unintentionally due to abnormalities of the interrupt controller 200 and the CPU 100, or when multiple interrupts occur more than the fixed number to be processed. The operation illustrated in FIG. 3 is the same as that illustrated in FIG. 2 up to time T5; therefore, the explanation up to time T5 is omitted.

At time T7, the internal interrupt signal INT2 becomes active (FIG. 3 (e)), and the interrupt flag register 230 is set (FIG. 3 (f)). As the result, the interrupt start signal IRS becomes active (FIG. 3 (g)), and the vector address VA which indicates an interrupt process corresponding to the interrupt flag register 230 is set (FIG. 3 (h): here, there is no value change because the same address is indicated.). By the interrupt start signal IRS, the interrupt counter 410 is incremented to "1" (FIG. 3 (j)). After that, it is assumed that the system has fallen into the state where an interrupt process is not completed due to abnormalities of the CPU 100.

At time T8, the internal interrupt signal INT1 becomes active (FIG. 3 (c)), and the interrupt flag register 220 is set (FIG. 3 (d)). The interrupt flag register 220 has a higher priority than the interrupt flag register 230. Accordingly, the interrupt start signal IRS becomes active (FIG. 3 (g)), and the vector address VA which indicates an interrupt process corresponding to the interrupt flag register 230 is set (FIG. 3 (h)). The interrupt counter 410 is incremented and the output IRC changes to "2" (FIG. 3 (j)).

At time T9, the external interrupt signal INT0 becomes active and the interrupt flag register 210 is set (FIG. 3 (a)). Since the interrupt flag register 210 has a higher priority than the interrupt flag register 220, the interrupt start signal IRS becomes active (FIG. 3 (g)), and the vector address VA which indicates an interrupt process corresponding to the interrupt flag register 210 is set (FIG. 3 (h)). Furthermore, the interrupt counter 410 is incremented to "3" (FIG. 3 (j)). As a result, the value of the interrupt counter 410 becomes equal to the value "3" set to the interrupt-acceptance-number upper limit setting register 420. The counter-abnormal-value detection circuit 430 detects abnormalities, and outputs the counter abnormality detection signal EC. Accordingly, the abnormality detection signal ER becomes active (FIG. 3 (k)).

Figure 4:
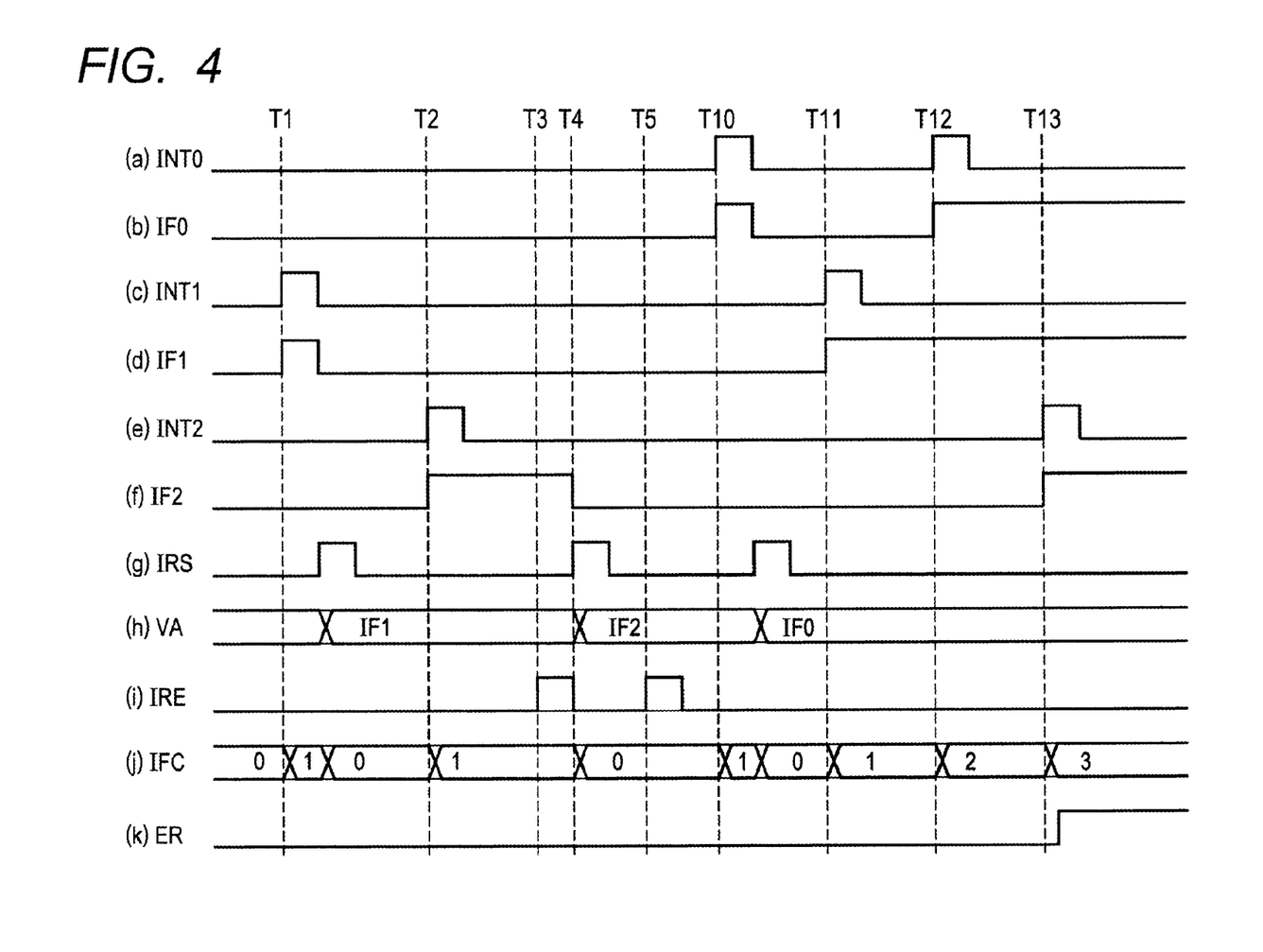
FIG. 4 is a timing chart explaining yet another operation of the data processing device according to the first embodiment.

FIG. 4 illustrates an example of a timing chart for the case where abnormalities that the interrupt flag hold number exceeds a predetermined value are detected. The number of hold of interrupts of which processing is not started is calculated in the abnormality detection circuit 300, and when the number of hold exceeds a fixed value, the abnormality detection signal ER is outputted. The present example illustrates operation for detecting abnormalities in the case where the interrupt process cannot be performed due to abnormalities of the interrupt controller 200 or the CPU 100.

Compared with FIG. 2, FIG. 4 illustrates the interrupt flag hold number IFC instead of the value IRC of the interrupt counter 410. The interrupt flag hold number IFC expresses the number of registers set, out of the interrupt flag registers 210, 220, and 230. The value of the hold-number upper limit setting register 320 is fixed to "3." The operation illustrated in FIG. 4 is the same as that illustrated in FIGS. 2 and 3 up to time T5; therefore, the explanation thereof is omitted.

At time T10, the external interrupt signal INT0 becomes active (FIG. 4 (a)), and the interrupt flag register 210 is set (FIG. 4 (b)). The interrupt-flag-hold-number detection circuit 310 sets the number of hold of "1" to the output IFC (FIG. 4 (j)). As the result, the interrupt start signal IRS becomes active (FIG. 4 (g)), and the vector address VA which indicates an interrupt process corresponding to the interrupt flag register 210 is set (FIG. 4 (h)). When the interrupt start signal IRS becomes active, the interrupt flag register 210 is cleared (FIG. 4 (b)), and the interrupt-flag-hold-number detection circuit 310 sets the number of hold of "0" to the output IFC (FIG. 4 (j)). After that, it is assumed that the system has fallen into the state where an interrupt process is not completed due to abnormalities of the CPU 100.

At time T11, the internal interrupt signal INT1 becomes active (FIG. 4 (C)), and the interrupt flag register 220 is set (FIG. 4 (d)). However, since an interrupt process corresponding to the interrupt flag register 210 of the highest priority is under way, the interrupt start signal IRS does not become active (FIG. 4 (g)). Therefore, the interrupt flag register 220 is not cleared (FIG. 4 (d)), and the interrupt-flag-hold-number detection circuit 310 remains having set the number of hold "1" to the output IFC (FIG. 4 (j)).

At time T12, the external interrupt signal INT0 becomes active (FIG. 4 (a)), and the interrupt-flag-hold-number detection circuit 310 sets the number of hold of "2" to the output IFC (FIG. 4 (j)). At time T13, the internal interrupt signal INT2 becomes active (FIG. 4 (e)). From the same reason, the interrupt flag registers 210 and 230 are not cleared after setting (FIG. 4 (b), (f)), and at time T13, the interrupt-flag-hold-number detection circuit 310 sets the number of hold of "3" to the output IFC (FIG. 4 (j)). Since the output IFC is in agreement with the setting value "3" of the hold-number upper limit setting register 320, the hold-number-abnormality detection circuit 330 activates the hold-number-abnormality detection signal EF; accordingly, the abnormality detection signal ER becomes active (FIG. 4 (k)).

Usually, in a micro controller which permits multiple interrupts, when an interrupt is received, a program counter value at the time is saved to a stack before starting an interrupt process. When returning from the interrupt process, the program counter value saved in the stack is recovered to the program counter. In a routine which is not related to saving and recovery of a stack pointer, when the system falls into an endless loop due to overrun of a CPU, a value of the stack pointer does not change; therefore, even if the stack pointer is monitored, it is impossible to detect the overrun. As shown in the present embodiment, the abnormality detection circuit 400 comprises the interrupt counter 410, the interrupt-acceptance-number upper limit setting register 420, and the counter-abnormal-value detection circuit 430. Since the interrupt counter 410 is incremented by the following interrupt request, and a setting value of the upper limit set to the interrupt-acceptance-number upper limit setting register 420 is exceeded, it is possible to detect CPU overrun even if the system falls into an endless loop in a routine which is not related to saving and recovery of a stack pointer. In the case of CPU overrun in which a certain routine is executed in spite of the fact that an interrupt request is not generated, when an end-of-interrupt signal is generated without accompanying recovery from a stack, the interrupt counter 410 underflows, accordingly the detection of the CPU overrun is enabled.

In a built-in system using a micro controller, it is common that a peripheral circuit requests an interrupt continuously. The abnormality detection circuit 300 described above comprises the interrupt-flag-hold-number detection circuit 310 which detects a total hold number of the interrupt flag registers 210, 220, and 230. Accordingly, when the number of interrupts on hold is equal to or greater than a reference value, it is possible to determine that the operation of the CPU 100 has stopped.

In the case where an end-of-interrupt signal is not generated in CPU overrun due to an endless loop, it is possible for the abnormality detection circuit 300 to detect abnormalities of a micro controller which does not permit multiple interrupts or abnormalities during an interrupt process with the highest priority, because these abnormalities are not accompanied by the increment of the interrupt counter 410.

Figure 5:
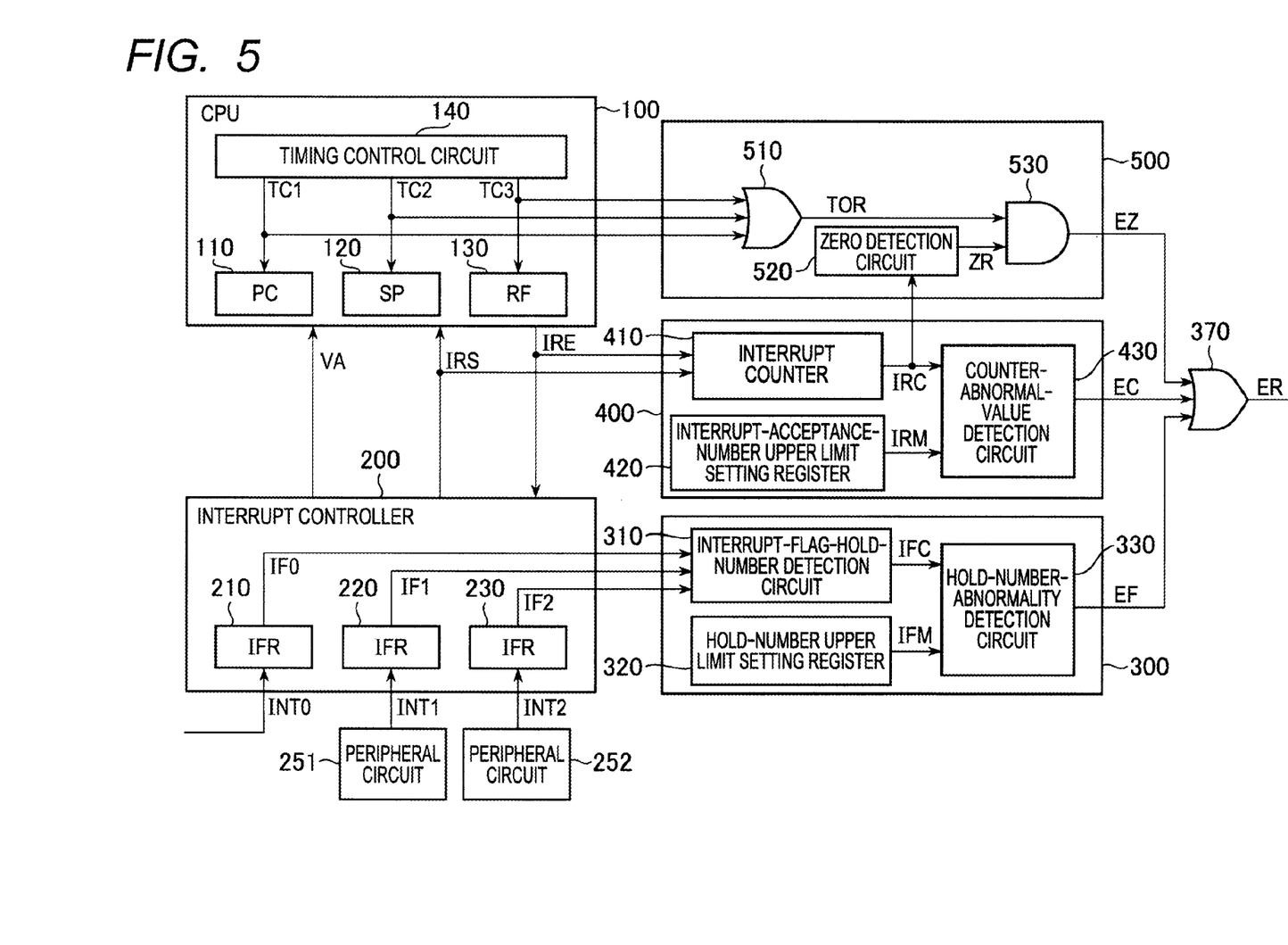
FIG. 5 is a drawing illustrating configuration of a data processing device according to a second embodiment of the present invention.

FIG. 5 illustrates configuration of a data processing device according to a second embodiment of the present invention. A CPU 100 of a data processing device according to the second embodiment is designed so as to operate in an asynchronous mode. The CPU 100 comprises internally a timing control circuit 140, a program counter 110, a stack pointer 120, and a flag register 130, the latter three being controlled by the timing control circuit 140. The data processing device according to the second embodiment comprises further an abnormality detection circuit 500, compared with the data processing device according to the first embodiment.

The timing control circuit 140 generates a control pulse and makes each register operate. The asynchronous CPU does not send pulses, such as a clock signal, to all registers concurrently, not as is the case with the synchronous system CPU, but is designed so as to send a pulse only to a necessary register. The timing control circuit 140 is a handshake control circuit of an asynchronous system which generates such a pulse. The timing control circuit 140 outputs timing control signals TC1, TC2, and TC3 to the program counter 110, the stack pointer 120, and the flag register 130, respectively.

The abnormality detection circuit 500 comprises a logical addition circuit 510, a zero detection circuit 520, and a logical product circuit 530. The logical addition circuit 510 generates a logical addition of the timing control signals TC1, TC2, and TC3, and outputs an output signal TOR. The zero detection circuit 520 inputs the interrupt count value IRC from the abnormality detection circuit 400, and outputs a signal ZR which indicates that the interrupt count value IRC is "0." The logical product circuit 530 inputs the output signal TOR of the logical addition circuit 510 and the output signal ZR of the zero detection circuit 520, and outputs the logical product thereof, as an output signal EZ. Therefore, that the output signal EZ of the logical product circuit 530 is active indicates that the CPU 100 is operating in a state where no interrupt is accepted. The output signal EZ of the abnormality detection circuit 500, the output signal EC of the abnormality detection circuit 400, and the output signal EF of the abnormality detection circuit 300 are inputted into the logical addition circuit 370, and a logical addition is outputted as an abnormality detection signal ER. Since other configurations are the same as those of the first embodiment, the explanation thereof is omitted.

Next, operation of the abnormality detection circuit 500 is explained with reference to a timing chart illustrated in FIG. 6.

Before time T21, the value IRC of the interrupt counter 410 is "0." In the asynchronous CPU 100 operating in an event-driven manner triggered by an interrupt, the present state indicates that no processing is performed and the CPU 100 is in a standby state for waiting for an event. While the CPU 100 is in a standby state, the timing control signals TC1, TC2, and TC3 in the CPU 100 do not become active.

Figure 6:
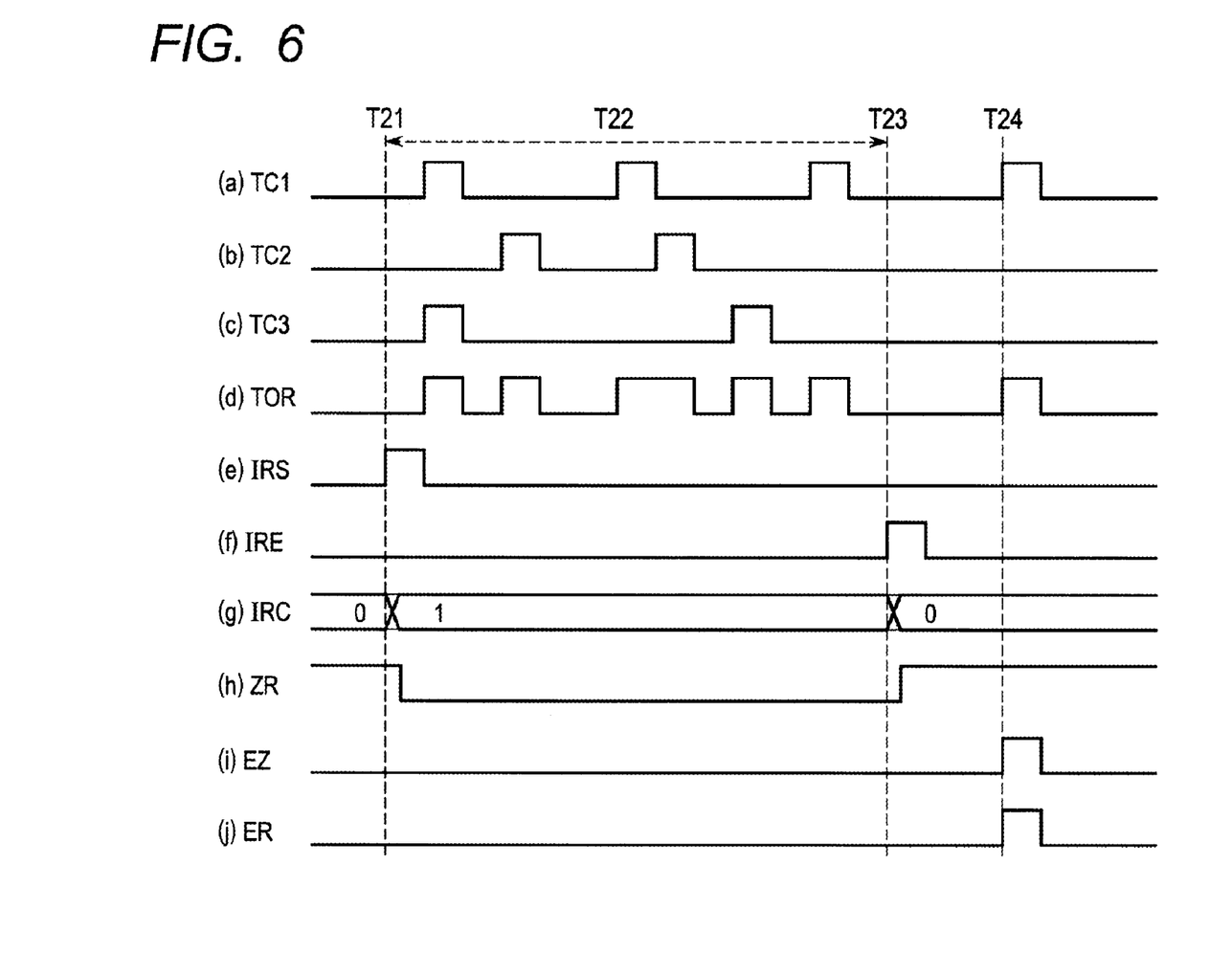
FIG. 6 is a timing chart explaining operation of the data processing device according to the second embodiment.

At time T21, a certain interrupt signal is inputted and the interrupt start signal IRS becomes active (FIG. 6 (*e*)). The interrupt counter 410 increments the count value and the interrupt count value IRC changes to "1" (FIG. 6 (*g*)). The CPU 100 starts an interrupt process.

During a period T22 from time T21 to time T23, the CPU 100 operates, and the timing control circuit 140 generates the timing control signals TC1, TC2, and TC3, and supplies them to the program counter 110, the stack pointer 120, and the register flag 130 (FIG. 6 (*a*), (*b*), (*c*)).

At time T23, the interrupt process is completed and the end-of-interrupt signal IRE becomes active (FIG. 6 (*f*)). Upon receiving the end-of-interrupt signal IRE, the interrupt counter 410 decrements the count value, and the interrupt count value IRC changes to "0" (FIG. 6 (*g*)). The CPU 100 enters a standby state again from the present time.

However, at time T24, when a pulse occurs in the timing control signal TC1 (FIG. 6 (*a*)) due to abnormal operation caused by a power supply noise etc., the output signal TOR of the logical addition circuit 510 becomes active (FIG. 6 (*d*)). Since the interrupt count value IRC is "0", the output signal ZR of the zero detection circuit 520 is active (FIG. 6 (*h*)), and the output signal EZ of the logical product circuit 530 also becomes active (FIG. 6(*i*)). Therefore, the abnormality detection signal ER becomes active (FIG. 6 (*j*)), and abnormalities are detected.

As described above, when a CPU operates in an asynchronous mode, it is possible to provide an abnormality detection circuit aiming at the further improvement of reliability, and in a standby state of the CPU, it is also possible to detect abnormal operation in the CPU. In a standby state where no request for interrupt process is made, if normal, the timing control circuit of the asynchronous CPU does not operate and the value of the stack pointer 120 does not change, either. Accordingly, it is impossible to detect abnormal operation resulting from reversal of an internal flip-flop value, only by monitoring the value of the stack pointer. The abnormality detection circuit 500 described above comprises the circuit which detects change of the timing control signal of the main registers (the program pointer 110, the stack pointer 120, and the flag register 130) in the asynchronous CPU 100, and the zero detection circuit 520 which detects the state where the CPU is not operating. Therefore, it is possible to detect if abnormalities have occurred in the internal state of the asynchronous CPU. In the case of a micro controller which operates in an event-driven manner, it can be considered that the time of a standby state is greatly longer than the time of a normal operation state. Accordingly, it becomes possible to enhance more the reliability in a standby state of the micro controller which mounts the asynchronous CPU.

The abnormal state of the micro controller includes CPU overrun, CPU deadlock, and abnormalities of a flip-flop (FF) in the CPU at the time of standby. It has been possible to detect CPU overrun until now only when the CPU overrun influences the stack pointer. However, according to the present invention, it is possible to detect abnormal operation regardless of the influence on the stack pointer. That is, in the present invention, the number of interrupt requests which the CPU has accepted, and the number of interrupt processes which the CPU has completed are counted by a counter. By determining whether a counter value which indicates the number of accepted interrupt requests reaches or exceeds a upper limit set up beforehand, or indicates an underflow, it becomes possible to detect an overrun state of the CPU, and a deadlock state in which the CPU does not operate.

In the present invention, the number of interrupt request for which execution is put on hold is counted. By detecting that the number becomes equal to or greater than a upper limit set up beforehand, an abnormal state of the CPU is detected. Thereby, it becomes possible to detect, as an abnormal state, an overrun state of the CPU in which an end-of-interrupt signal is not generated and a deadlock state in which the CPU does not operate, even in a case where multiple interrupts are forbidden or in a case where abnormalities occur during an interrupt process with a high priority.

In the present invention, abnormalities are detected by two kinds of methods: abnormality detection according to the number of interrupt request which the CPU has accepted, and abnormality detection according to the number of interrupt request for which execution has been put on hold. Accordingly, the micro controller which mounts the abnormality detection circuit according to the present invention can set up a threshold of abnormality detection flexibly according to the number and kind and frequency of occurrence of an interrupt request and multiple interrupts of each system. Accordingly, it is possible to improve the reliability of the system much more.

As shown in the second embodiment, by monitoring the timing control signals of the program counter, the stack pointer, and the flag register of the CPU while no interrupt process is executed, it is possible to detect an abnormal state in which the CPU starts to operate in spite of the fact that no interrupt request is made.

In the above, the invention of the present application is explained with reference to embodiments. The invention of the present application is not limited to the above-described embodiments. It should be understood by those skilled in the art that various modifications and alterations as for the configuration and details of the invention of the present application may occur depending on design requirements and other factors insofar as they are within the scope of the appended claims or the equivalents thereof.

What is claimed is:

1. A data processing device comprising:
   a CPU;
   an interrupt counter operable to increment a count value based on an interrupt start signal which is outputted in response to an interrupt signal indicative of an interrupt request to the CPU and which indicates that the interrupt request has been accepted, and operable to decrement the count value based on an end-of-interrupt signal which indicates that processing corresponding to the interrupt has completed;
   a counter-abnormal-value detection circuit operable to detect abnormalities by comparing the count value with a predetermined value; and
   a timing-control-signal monitoring circuit operable to monitor a timing control signal generated when the CPU is in operation and operable to output an overrun detection signal by detecting that the timing control signal is generated when the CPU is at a stop.

2. The data processing device according to claim 1 further comprising:
   an acceptance number register operable to hold an interrupt-acceptance upper limit number indicative of an upper limit of a number of multiple acceptance of the interrupt,
   wherein the counter-abnormal-value detection circuit outputs a counter abnormality detection signal, when the counter value indicates a value equal to or greater than the interrupt-acceptance upper limit number held by the acceptance number register or the counter value indicates an underflow.

3. The data processing device according to claim 2, wherein the CPU stores the interrupt-acceptance upper limit number into the acceptance number register.

4. The data processing device according to claim 1, further comprising:
   a plurality of flag registers, each operable to be set in response to the interrupt signal and to indicate that an interrupt request is made;
   a hold number detection circuit operable to detect an interrupt hold number indicated by the number of flag registers set among the flag registers; and
   a hold-number-abnormality detection circuit operable to detect abnormalities by comparing the interrupt hold number with a predetermined number.

5. The data processing device according to claim 4, further comprising:
   a hold number register operable to hold a hold number upper limit indicative of an upper limit of the interrupt hold number,
   wherein the hold-number-abnormality detection circuit outputs a hold-number-abnormality detection signal, when the interrupt hold number indicates a value equal to or greater than the hold number upper limit.

6. The data processing device according to claim 4, wherein the flag register is reset in response to the interrupt start signal.

7. The data processing device according to claim 1, wherein the timing-control-signal monitoring circuit outputs an overrun detection signal, upon detecting that the timing control signal is generated, with the assumption, that the CPU is at a stop when a count value of the interrupt counter indicates zero.

8. The data processing device according to claim 1, wherein the timing control signal indicates a signal outputted when operating a register in the CPU.

9. A semiconductor integrated circuit device mounting:
   a data processing device according to claim 1.

10. An abnormality detection method for detecting an operation abnormality of a CPU, comprising:
    incrementing a count value based on an interrupt start signal which is outputted in response to an interrupt signal indicative of an interrupt request to the CPU and which indicates that the interrupt request has been accepted;
    decrementing the count value based on an end-of-interrupt signal which indicates that processing corresponding to the interrupt has completed;
    detecting abnormalities of the counter value by comparing the count value with a predetermined value; and
    monitoring a timing control signal generated when the CPU is in operation; and
    detecting an overrun when the timing control signal is generated while the CPU is at a stop.

11. The abnormality detection method according to claim 10, wherein the step of detecting abnormalities of the counter value includes:
    holding an interrupt-acceptance upper limit number indicative of an upper limit of a number of multiple acceptance of the interrupt; and
    determining that a counter abnormality has been detected, when the counter value indicates a value equal to or greater than the interrupt-acceptance upper limit number or the counter value indicates an underflow.

12. The abnormality detection method according to claim 10, further comprising:
    setting a flag register indicating that an interrupt request is made, in response to the interrupt signal;
    detecting an interrupt hold number indicated by the number of flag registers set among the flag registers; and
    detecting abnormalities of the interrupt hold number by comparing the interrupt hold number with a predetermined number.

13. The abnormality detection method according to claim 12, wherein the step of detecting abnormalities of the interrupt hold number includes:
    holding a hold number upper limit indicative of an upper limit of the interrupt hold number into a hold number register; and
    determining abnormalities of the interrupt hold number, when the interrupt hold number indicates a value equal to or greater than the hold number upper limit.

14. The abnormality detection method according to claim 11, wherein the step of detecting the overrun includes:
    determining whether a count value of the interrupt counter indicates zero; and
    detecting a CPU overrun with the assumption that the CPU is at a stop when the count value of the interrupt counter indicates zero.

* * * * *

UNITED STATES PATENT AND TRADEMARK OFFICE
CERTIFICATE OF CORRECTION

PATENT NO. : 8,392,643 B2
APPLICATION NO. : 13/034236
DATED : March 5, 2013
INVENTOR(S) : Ryoichi Yamaguchi and Hisashi Abe Page 1 of 1

It is certified that error appears in the above-identified patent and that said Letters Patent is hereby corrected as shown below:

In the Specification

Column 4, Line 17: delete "f lag" and insert -- flag --.

In the Claims

Column 12, Line 4: In Claim 7, delete "assumption," and insert -- assumption --.

Column 12, Line 56: In Claim 14, delete "claim 11," and insert -- claim 10, --.

Signed and Sealed this
Fourteenth Day of October, 2014

Michelle K. Lee
*Deputy Director of the United States Patent and Trademark Office*